United States Patent [19]

Wiseman

[11] 4,042,791
[45] Aug. 16, 1977

[54] STEREOPHONIC HEAD REST

[75] Inventor: Murriel L. Wiseman, Santa Clara, Calif.

[73] Assignee: Murriel L. Wiseman, Santa Clara, Calif.

[21] Appl. No.: 553,579

[22] Filed: Feb. 27, 1975

[51] Int. Cl.² .................................... H04R 5/02
[52] U.S. Cl. ............................ 179/146 H; 181/141
[58] Field of Search .................................. 179/146 H

[56] References Cited

U.S. PATENT DOCUMENTS

| 2,464,435 | 3/1949 | Conradt | 179/182 R X |
| 2,501,993 | 3/1950 | Conradt | 179/146 H X |
| 2,908,766 | 10/1959 | Taylor | 179/146 H X |
| 3,512,605 | 5/1970 | McCorkle | 179/146 H X |

FOREIGN PATENT DOCUMENTS 894,900  4/1962  United Kingdom ............... 179/1 E Primary Examiner—William C. Cooper

[57] ABSTRACT

A stereophonic headrest adjustably communicates with a back rest of an automobile seat, comprises a central elongated rectangular shaped portion and a pair of side wing portions, wherein the side wing portions hingably communicate with the ends of the central portion. A speaker unit having a volume control knob is contained in each wing portion. The side wing portions can be angled at a plurality of different obtuse angles relative to the central portion allowing maximization of the stereophonic sounds as directed onto the ears of the user.

3 Claims, 4 Drawing Figures

FIG. 1

U.S. Patent      Aug. 16, 1977      4,042,791
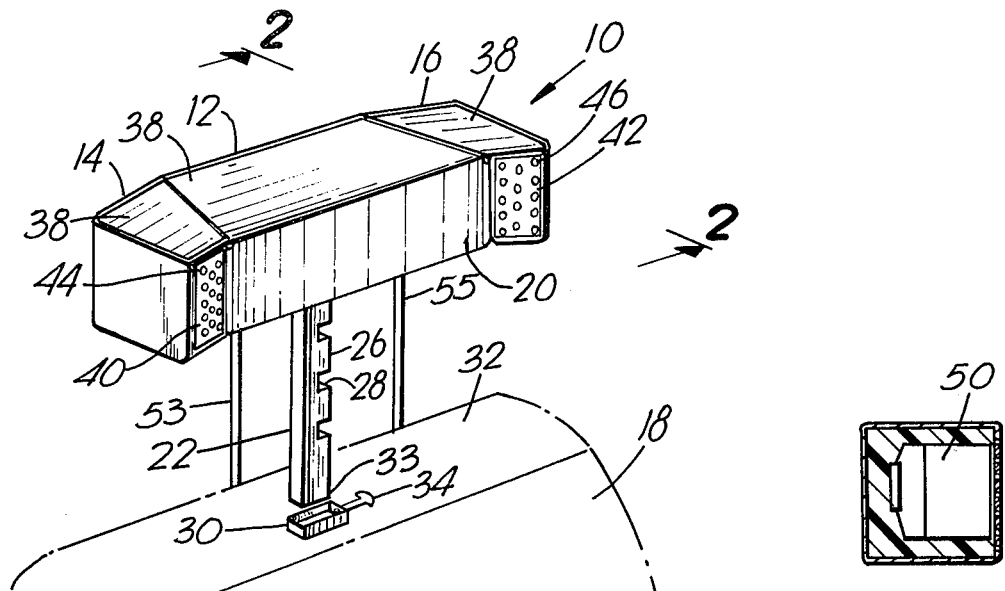
FIG. 1
FIG. 2
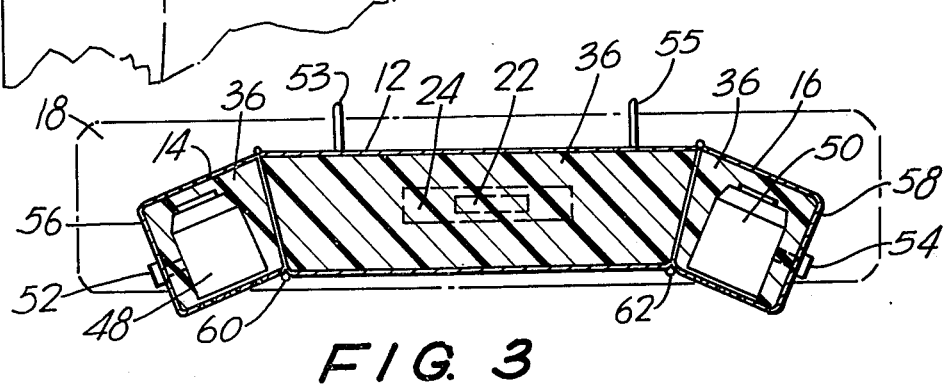
FIG. 3
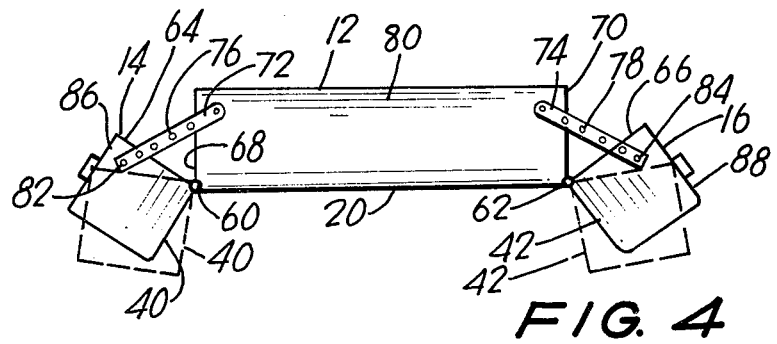
FIG. 4

STEREOPHONIC HEAD REST

SUMMARY OF THE INVENTION

My present invention relates to a unique and novel stereophonic headrest, wherein the headrest provides a means of supplying stereophonic sounds directed onto the ears of a user.

A number of U.S. Pat. Nos.: 3,098,128; 3,230,320; and 3,384,719 have employed a plurality of various type headrests, but these aforementioned patents are non-applicable to my present invention.

An object of my present invention is to provide a headrest for an automobile seat, wherein a pair of audio speakers are contained within side wing portions of the headrest.

A further object of my present invention is to provide a means of control of the volume of each speaker independently of the other.

A still further object of my present invention is to provide a means of maximizing the direction of the stereophonic sounds relative to the user's ears.

Breifly, my present invention comprises a headrest having a central elongated rectangular shaped portion and a pair of side wing portions, wherein the side wing portions hingably communicate with the ends of the central portion. A speaker unit having a volume control knob is contained in each wing portion. The side wing portions can be angled at a plurality of different obtuse angles relative to the central portion allowing maximization of the stereophonic sounds as directed onto the ears of the user.

BRIEF DESCRIPTION OF THE DRAWINGS

The objects and features of the invention may be understood with reference to the following detailed description of an illustrative embodiment of the invention, taken together with the accompanying drawings in which:

FIG. 1 illustrates a front perspective view of a stereophonic headrest adjustably communicating with a backrest of an automobile seat;

FIG. 2 illustrates an end cross-sectional view of the headrest taken along line 2—2 of FIG. 1;

FIG.3 illustrates a top cross sectional view of the headrest; and

FIG. 4 illustrates a top planar view of the headrest.

DESCRIPTION OF THE PREFERRED EMBODIMENT

Turning now descriptively to the drawings, in which similar reference characters denote similar elements throuhgout the several views, FIGS. 1, 3 show a stereophonic headrest 10 adjustably communicating with a backrest 18 of an automobile seat (not shown). The headrest 10 besides providing support for the head of a user also provides a means of supplying stereophonic sound reproduction directly to the ears of the user seated in the automobile seat. The headrest 10 broadly comprises a central back portion 12 of an elongated, rectangular shaped configuration and a pair of extending side wing portions 14, 16 wherein portions 14, 16 hingably cooperate with portion 12. The portions 14, 16 are positioned so as to extend forwardly at a plurality of different obtuse angles to the front surface 20 of portion 12. An elongated rectangular shaped rod 22 extends vertically downward from a bottom base 24 of the portion 12, wherein a longitudinal face 26 of the rod 22 has a plurality of evenly spaced notches 28 of a rectangular configuration therein. The top surface 32 of backrest 18 has a rectangular shaped sleeve bracket 30 therein, wherein sleeve bracket 30 extends vertically downward into backrest 18. An upper end of bracket 30 is exposed above the top surface 32 of backrest 18, wherein a detent member 34 is slidably contained through a sidewall of the upper end of bracket 30. The free bottom end 33 of rod 22 is slidably contained within bracket 30, wherein detent member 34 engages one of the notches 28 allowing the headrest 10 to be set at a plurality of different vertical heights relative to backrest 18. The interiors 36 of the central portion 12, and the side wing portions 14, 16 are of a foam rubber composition, wherein the foam rubber composition serves as a baffle means for the stereophonic sounds, as well as serving as a shock absorbing means for the head of the user. The outer covering 38 of the central portion 12 and side wing portions 14, 16 is formed from a suitable thermoplastic such as vinyl. The front faces 40, 42 of the left 14 and right 16 side wing portions each have a plurality of openings 44, 46 therethough.

FIGS. 2, 3 show speaker units 48, 50 mounted within side wing portions 14, 16, wherein the stereophonic sounds pass outward through openings 44, 46 onto the ears of the user. The side wing portions 14, 16 have a generally trapezodial cross sectional area, wherein volume control knobs 52, 54 are contained in the outside end walls 56, 58 of the side wing portions 14, 16. Electrical lead wires 53, 55 communicate with the circuit of each knob 52, 54, and each speaker unit 48, 50 allowing individual control of the volume of each speaker unit 48, 50.

FIG. 4 shows the hinge assemblies 60, 62 communicating between each inside end wall 64, 66 of the side wing portions 14, 16 and each distal end 68, 70 of the central portion 12, wherein each hinge assembly 60, 62 is affixed onto the forward portion of each distal end 68, 70 and each end wall 66 of side wing portions 14, 16. The side wing portions 14, 16 swing outward from the rear of distal ends 68, 70, wherein the front faces 40, 42 of each side wing portion 14, 16 forms an obtuse angle with the front face 20 of portion 12. Each side wing portion 14, 16 can be independently set at different obtuse angles so as to maximize the user's hearing depending upon his head size, his hearing ability and the relative position of his head on the headrest 10. Elongated horizontal bar members 72, 74 of a flexible character have a plurality of evenly spaced holes 76, 78 therethrough wherein members 72, 74 are rotatably mounted on the top base 80 at each distal end 68, 70 of the central portion 12. Pin members 82, 84 are contained on the top surfaces 86, 88 of each side wing portion 14, 16 wherein the pin members 82, 84 each extend upward into one of the holes 76, 78 of each member 72, 74 allowing the side wing portions 14, 16 to be locked in position relative to the central portion 12.

Hence, obvious changes may be made in the specific embodiment of the invention described herein, such modifications being within the spirit and scope of the invention claimed, it is indicated that all matter contained herein is intended as an illustrative and not as limiting in scope.

Having thus described to invention, what I claim as new and desire to secure by Letters Patent of the United States is:

1. A stereophonic head rest adjustably supported on a back rest of an automobile seat, which comprises:

a. a central back portion having a pair of distal ends and a front face;
b. a pair of side wing portions having a front face and a top surface, said front face of each said side wing portion having a plurality of openings therethrough;
c. a speaker unit affixed in each said side wing portion;
d. one said side wing portion hingedly attached onto each said distal end of said central back portion, said front face of each said side wing portion intersecting said front face of said central back portion at an obtuse angle; and
e. means for locking in position each said wing portion to said central back portion at prescribed obtuse angle, said means comprising pin members extending upwardly from said top surface of each said wing portion, a pair of elongated horizontal bar members having a plurality of evenly spaced holes therethrough adapted to receive said pin member, and means for rotatably attaching each said bar member onto said top surface of said central back portion at each said distal end thereof.

2. A headrest as recited in claim 1, wherein each said speaker unit includes a volume control knob associated therewith.

3. A head rest as recited in claim 1, wherein said central portion and said side wing portions have an formed interior and an exterior thermoplastic outer covering.

* * * * *